United States Patent [19]
Garcia et al.

[11] Patent Number: 5,664,830
[45] Date of Patent: Sep. 9, 1997

[54] CHILD SAFETY SEAT ASSEMBLY

[75] Inventors: Birgit S. Garcia, P.O. Box 450, Pebble Beach, Calif. 93953; Scott Ganaja, San Luis, Calif.

[73] Assignee: Birgit S. Garcia, Pebble Beach, Calif.

[21] Appl. No.: 752,737

[22] Filed: Nov. 19, 1996

[51] Int. Cl.⁶ .................................................. B60N 2/42
[52] U.S. Cl. ............................ 297/216.11; 297/250.1
[58] Field of Search ........................ 297/216.11, 216.1, 297/250.1, 216.19, 256.1, 256.13, 256.14, 216.16

[56] References Cited

U.S. PATENT DOCUMENTS

| 3,957,303 | 5/1976 | Mauron | 297/216.11 |
| 5,110,182 | 5/1992 | Beauvais | 297/256.13 X |
| 5,290,089 | 3/1994 | Oleszko et al. | 297/216.1 X |
| 5,294,183 | 3/1994 | Wetter et al. | 297/216.11 X |
| 5,462,333 | 10/1995 | Beauvais | 297/216.11 |
| 5,551,751 | 9/1996 | Sedlack et al. | 297/256.13 |

FOREIGN PATENT DOCUMENTS 4236198  4/1994  Germany ................ 297/216.11

Primary Examiner—Milton Nelson, Jr.
Attorney, Agent, or Firm—Thomas S. Baker, Jr.

[57] ABSTRACT

A novel child safety seat assembly for utilization in an automotive vehicle is comprised of a base sub-assembly having a pair of arcuate side rails, of a seat sub-assembly slidably supported on the base sub-assembly and having a pair of arcuate side rails engaged with the base sub-assembly arcuate side rails, and a collapsible energy absorber element functionally positioned intermediate the base sub-assembly and the seat sub-assembly.

3 Claims, 4 Drawing Sheets

CHILD SAFETY SEAT ASSEMBLY

CROSS-REFERENCES

None.

FIELD OF THE INVENTION

This invention relates generally to child safety seats intended for installation in automotive vehicles, and particularly concerns an improved child safety seat assembly which advantageously functions in the event of severe incorporating-vehicle collision to rotate the seat occupant to a less injurious position and with reduced impact shock.

BACKGROUND OF THE INVENTION

Numerous different child safety seat configurations and constructions have heretofore been utilized in the United States in various automotive vehicle applications. The most frequently used child safety seat construction basically involves a forward-facing molded seat having an attached harness/belt restraint for properly retaining the child occupant in the seat and a separate seat-belt restraint for retaining the molded seat in its proper position upon a conventional seat of the automotive vehicle. In such known child safety seat installations it is common, in the case of severe collision of the incorporating automotive vehicle, for the child safety seat occupant to experience a high degree of collision impact shock and possible or even probable consequential occupant injury.

I have discovered that the shortcomings of the known child safety seat constructions may advantageously be avoided by incorporating as few as two additional construction features or elements into the prior art child safety seat configurations. Such additional features utilize the forward momentum of the child safety seat occupant to rotate that occupant into a more reclined seated position and also utilize a separate energy-absorbing construction element or system to extend the duration of collision impact loadings on the safety seat over a longer period of time.

Other objects and advantages of my invention will become apparent during consideration of the descriptions and drawings which follow.

SUMMARY OF THE INVENTION

The child safety seat assembly of the present invention is basically comprised of a frame-like base sub-assembly, a molded seat sub-assembly slidably mounted on the base sub-assembly, and an energy-absorbing member functionally situated intermediate the seat and base sub-assemblies. The frame-like base sub-assembly has a restraint means for use in retaining the same in a proper position upon a conventional automotive vehicle seat, and also has a pair of arcuate, tongue like, side rail elements mounted at opposite sides of the base sub-assembly. The molded seat sub-assembly has a body restraint means for the seat occupant, and also has a pair of arcuate, groove-like, side rail elements that are attached at opposite sides of the seat sub-assembly and that functionally engage the corresponding base sub-assembly pair of side rail elements. Additionally, the novel child safety seat construction of the present invention incorporates at least one energy-absorbing device such as a honeycomb core energy absorption cylinder, a foamed polyurethane block, a shock strut, or the like in the assembly functionally intermediate the seat member and the frame-like base member.

Also, it is preferred to incorporate a shear pin element in the improved child safety seat assembly as between the base member and the seat member. The shear pin element functions as a "threshold" control device which prevents the displacement of the seat member relative to the base member as during normal use and except upon the occurrence of substantial assembly/occupant deceleration as in the case of an automotive vehicle collision occurring at velocities above some predetermined level of magnitude.

In the event of vehicle collision involving the incorporating vehicle, the shear pin device in the improved child safety seat assembly is completely sheared, the assembly seat and occupant are caused to be rotated relative to the assembly base sub-assembly to position the seat occupant in a more reclined position, and a portion of the inertial energy of the seat/occupant combination is absorbed in the included energy-absorbing device.

DETAILED DESCRIPTION

Figure 1:
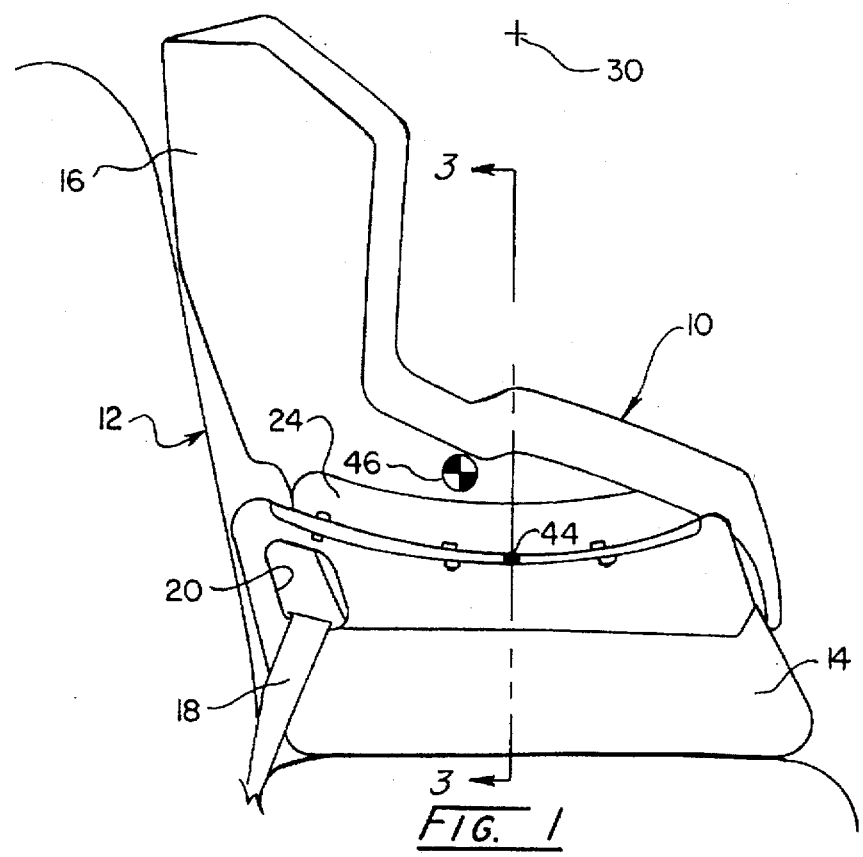
FIG. 1 is a side elevation view of a preferred embodiment the improved child safety seat of the present invention.
Figure 2:
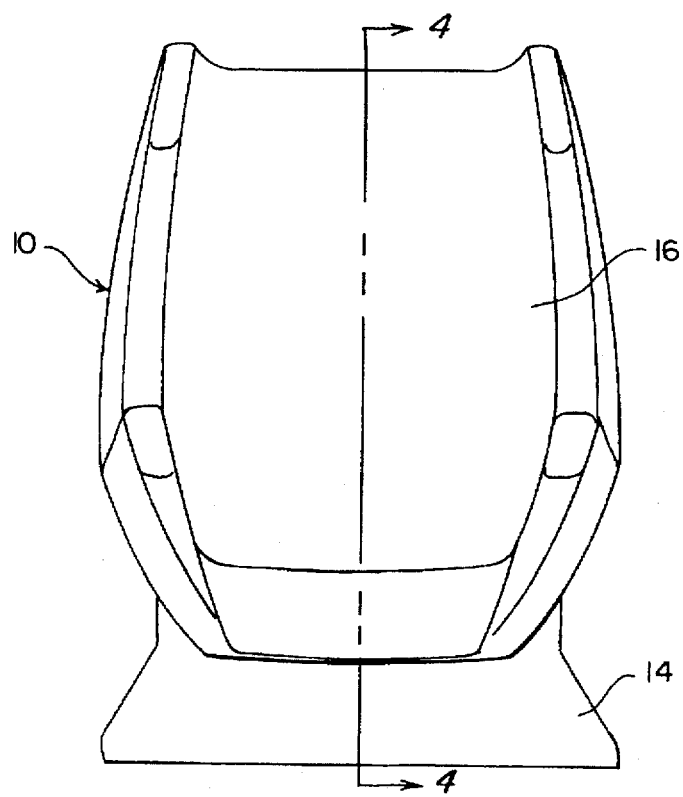
FIG. 2 is a front elevation view of the child safety seat illustrated in FIG. 1.

FIG. 1 illustrates the preferred embodiment of the child safety seat assembly 10 of the present invention in its customary mounted position on a conventional automotive vehicle seat 12, such safety seat essentially being comprised of a base sub-assembly 14 supported by vehicle seat 12 and a seat sub-assembly 16 supported by base 14 through the hereinafter-described co-operating, arcuate side rail elements. Safety seat 10 is restrained in its proper position on vehicle seat 12 a typical passenger seat lap belt 18 that passes through openings 20 in base sub-assembly 14 and that has its ends preferably secured to the automotive vehicle frame.

It is preferred that seat sub-assembly 16 be molded to a configuration such as that illustrated in the drawings using a plastic material such as a polyethylene resin having high density and high impact strength physical properties. Such materials may also be utilized in the manufacture of base sub-assembly 14 although it is common to make the frame portion of sub-assembly 14 from formed and welded pieces of metal tubing 15 such as a conventional steel tubing.

Figure 3:
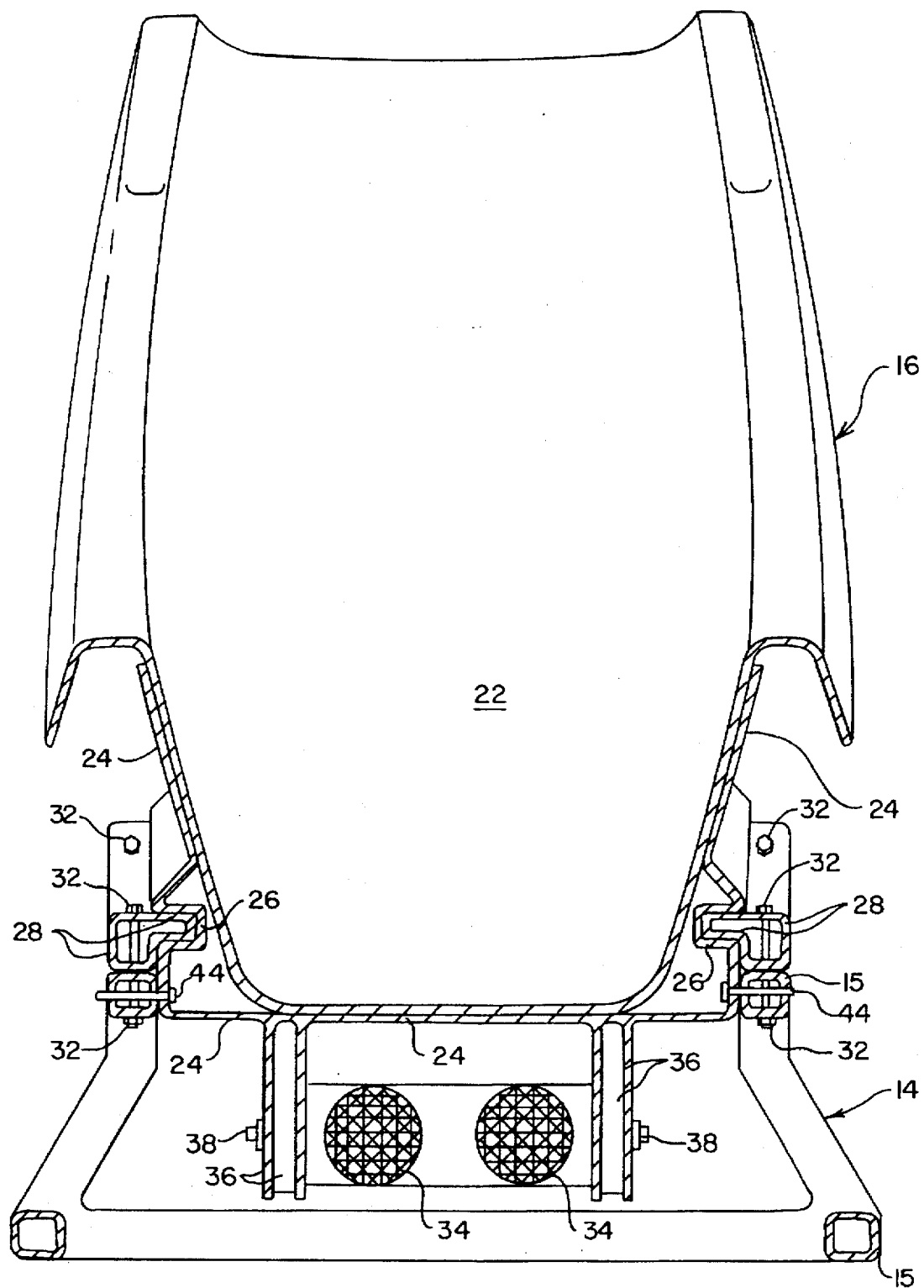
FIG. 3 is a section view taken at line 3—3 of FIG. 1.

As shown in FIG. 3, seat sub-assembly 16 is basically comprised of a molded seat element 22 and an adhesively attached molded seat pan element 24 that includes the pair of integrally molded, groove-like, side rail elements designated 26 which also are arcuate in their longitudinal configuration. See FIGS. 1 and 5. The center of curvature for integral side rail elements 26 is at the position designated 30 in FIG. 1.

Side rail elements 26 functionally co-operate with the pair of tongue-like, side rail elements designated 28 which are attached to base sub-assembly 14 by bolt fasteners 32 and which also are arcuate in their longitudinal configuration. See FIGS. 1 and 5. Rail elements 28 have the same axis of curvature 30 as, and slidably engage, side rail elements 26. Satisfactory side rail configurations other than the illustrated "tongue and groove" configuration are possible.

Safety seat assembly 10, as previously indicated, further includes at least one energy absorbing element which is installed in the assembly intermediate base sub-assembly 14 and seat sub-assembly 16. In the preferred embodiment of the drawings such element takes the form of paired honeycomb core energy absorption cylinders 34. One particularly satisfactory honeycomb core cylinder is comprised of alternate sheets of flat aluminum foil and corrugated aluminum foil wound around a mandrel (later removed) and adhesively bonded together with suitable end closures. Alternately, other forms of energy absorbing elements that would function equivalently to honeycomb core cylinders 34 are blocks of a compressible material, such as a foamed polyurethane, or gas- or liquid-filled shock absorbers. Such devices function to absorb a portion of the imposed impact energy and spread the effect of impact over a longer period of time.

As shown in the drawings, elements 34 are each connected at one end to an extension 36 of seat pan element 24 by a conventional pivot connection 38, and at its other end to an extension 40 of the frame of base sub-assembly 14 by a like pivot connection 42. See FIGS. 4 and 6. Also, in many instances it is preferred to include removable shear pins 44 in assembly 10 intermediate the co-operating rail elements at each side of seat sub-assembly 16 and base sub-assembly 14. Such shear pins by their shear strength establish a threshold level only above which imposed inertial loads are transmitted from seat sub-assembly 16 and imposed on energy absorbing elements 34 to cause them to become crushed or collapsed.

The functioning of the automotive vehicle seat 12 and safety seat assembly 10 combination can best be understood by reference to FIGS. 1 and 4 through 6. In connection with those Figures, it should be noted that the center of gravity 46 of the seat/occupant portion of the combination is typically positioned above the elevation of the track comprised of slidably engaged side rail elements 26 and 28. See FIG. 1.

In the event of a substantial collision involving the automotive vehicle which includes properly mounted child safety seat assembly 10 (with properly restrained child occupant included), and following the shearing of shear pins 44, the excess and non-absorbed inertial energy by components of the reaction forces causes counter-clockwise rotation of seat sub-assembly 16 and its occupant relative to base sub-assembly 14. Because the arc of the track is a true radius the seat sub-assembly may be considered to be supported like a pendulum at the axis of rotation 30. During frontal impact, forces act to move the seat occupant's center of gravity forward. Because of the constraints due to the track (or pendulum), such center of gravity "swings" forward while simultaneously the seat rotates counter-clockwise.

Figure 4:
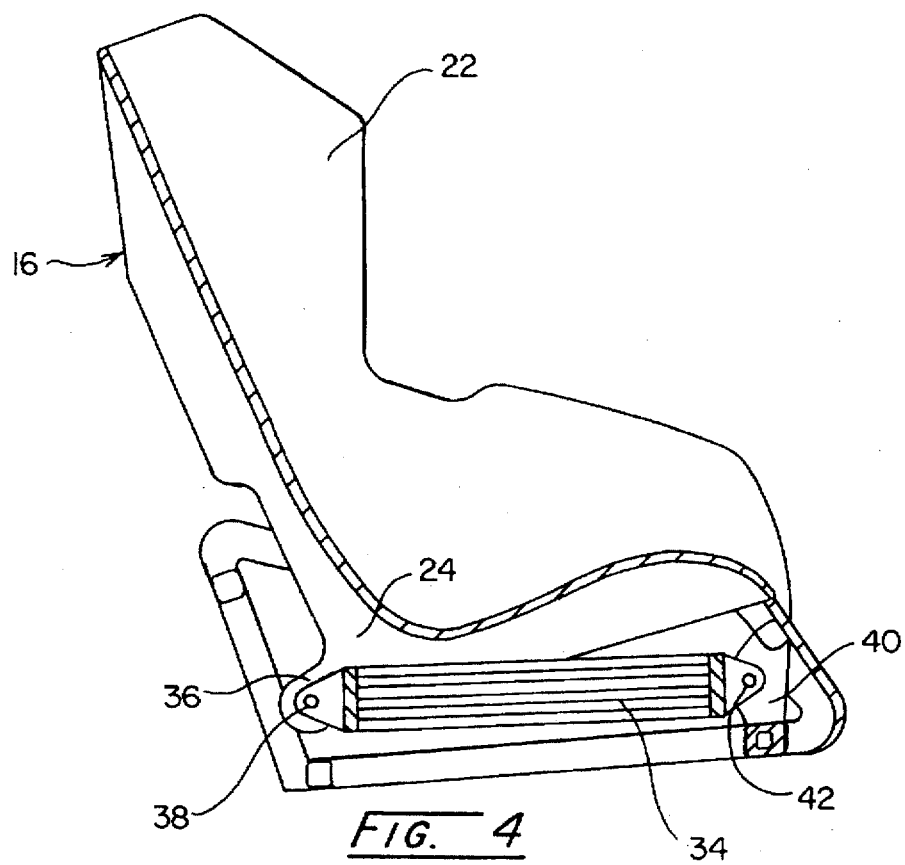
FIG. 4 is a section view taken at line 4—4 of FIG. 2.
Figure 5:
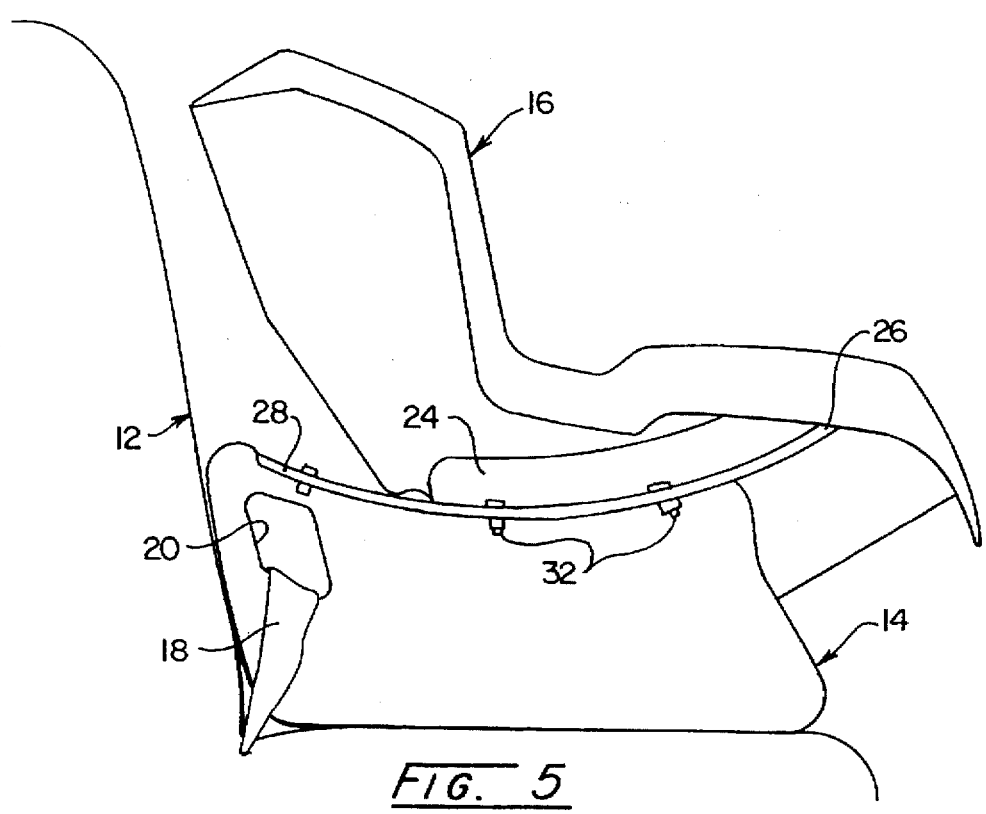
FIG. 5 is a side elevation view illustrating the improved child safety seat of the invention in its fully-reclined position such as immediately following a severe collision of the incorporating automotive vehicle with another automotive vehicle.
Figure 6:
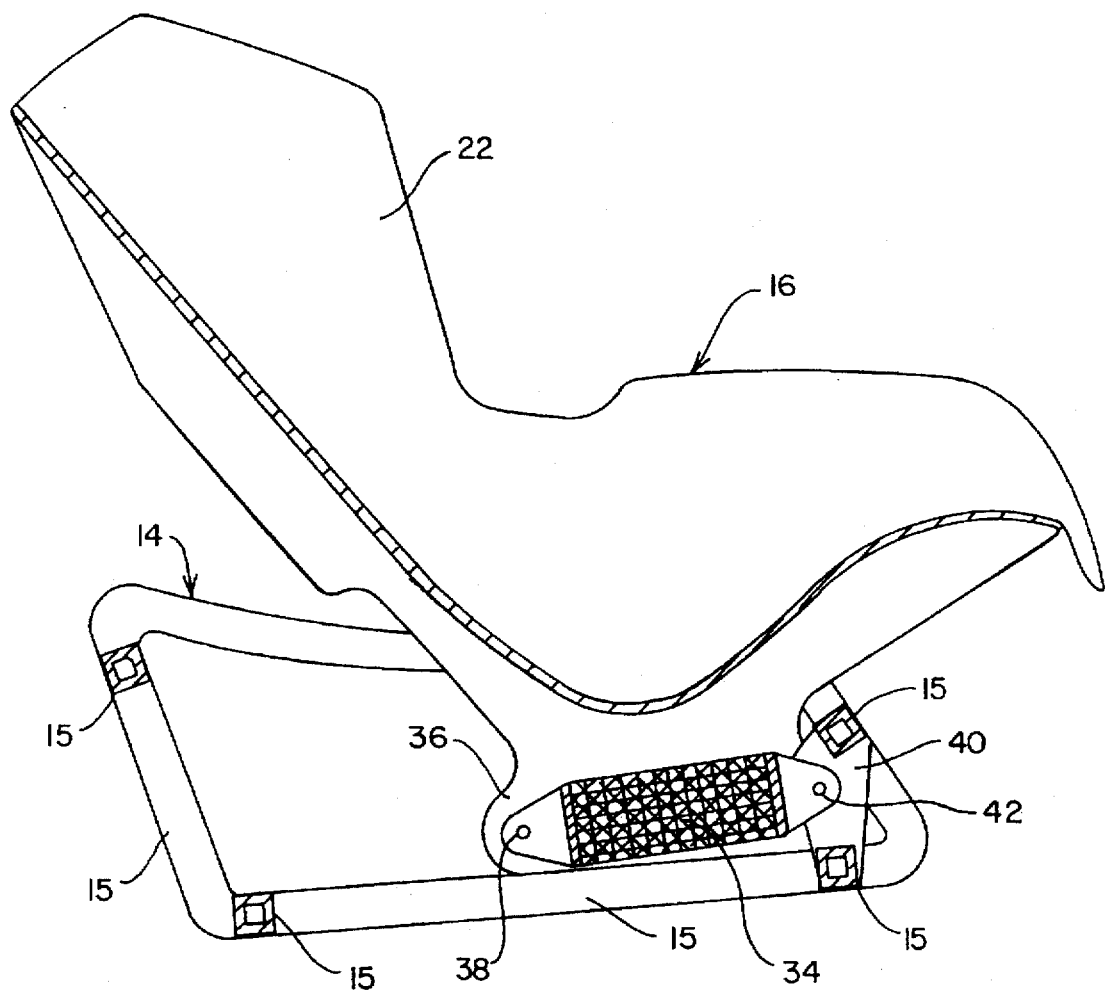
FIG. 6 is a section view similar to FIG. 4 but illustrating the improved child safety seat of the invention in its fully reclined position and with its included energy-absorbing device in a fully-collapsed condition.

As shown in the drawings, rotational movement of seat sub-assembly 16 counter-clockwise relative to base sub-assembly 14, and from its FIGS. 1 and 4 position to its FIGS. 5 and 6 position, further causes the transfer of the excess inertial energy into energy absorbing cylinders 34 with consequent crushing or collapsing.

Changes may be made to the shapes, sizes, and materials of construction specified in the foregoing detailed description without departing from the scope or intent of the following claims.

We claim our invention as follows:

1. A child safety seat for use in an automotive vehicle, and comprising:

a base sub-assembly having a spaced-apart pair of rigidly attached side rail elements which each have a longitudinally arcuate configuration;

a seat sub-assembly supported by said base sub-assembly and having an occupant restraint means and a spaced-apart pair of rigidly attached side rail elements which each have a longitudinally arcuate configuration and is slidably engaged with a respective one of said base sub-assembly side rail elements; and collapsible energy absorbing means connected to said base sub-assembly and to said seat sub-assembly;

said base and seat sub-assembly longitudinally arcuate side rail configurations having the same axis of rotation, and said collapsible energy absorbing means being collapsed when said seat sub-assembly is rotated in a given direction relative to said base sub-assembly.

2. The child safety seat defined by claim 1 wherein said energy absorbing means comprises a collapsible honeycomb core cylinder.

3. The child safety seat defined by claim 2 and further comprised of shear pin means functionally positioned intermediate said base sub-assembly and said seat sub-assembly, said shear pin means restraining said seat sub-assembly attached side rail elements from slidable movement relative to said base sub-assembly attached side rail elements until a threshold level of seat subassembly inertial force has been attained by the seat sub-assembly.

* * * * *